United States Patent
Habisreitinger et al.

(10) Patent No.: US 8,375,812 B2
(45) Date of Patent: Feb. 19, 2013

(54) METHOD AND DEVICE FOR CARRYING OUT A WORK OPERATION ON A MOVING WORKPIECE

(75) Inventors: Uwe Habisreitinger, Lossburg (DE); Rainer Scheeff, Grafenau (DE)

(73) Assignee: Daimler AG, Stuttgart (DE)

(*) Notice: Subject to any disclaimer, the term of this patent is extended or adjusted under 35 U.S.C. 154(b) by 68 days.

(21) Appl. No.: 13/056,996

(22) PCT Filed: Aug. 6, 2009

(86) PCT No.: PCT/EP2009/005712
§ 371 (c)(1),
(2), (4) Date: Feb. 1, 2011

(87) PCT Pub. No.: WO2010/017914
PCT Pub. Date: Feb. 18, 2010

(65) Prior Publication Data
US 2011/0130859 A1   Jun. 2, 2011

(30) Foreign Application Priority Data
Aug. 9, 2008   (DE) .................. 10 2008 037 239

(51) Int. Cl.
*G01M 19/00*   (2006.01)

(52) U.S. Cl. .................................... 73/865.8

(58) Field of Classification Search ............... None
See application file for complete search history.

(56) References Cited

U.S. PATENT DOCUMENTS

| 3,283,918 A | 11/1966 | Devol |
| 6,804,583 B2 | 10/2004 | Kim et al. |
| 2008/0302636 A1* | 12/2008 | Noguchi et al. .......... 198/617 |
| 2009/0226292 A1 | 9/2009 | Habisreitinger |

FOREIGN PATENT DOCUMENTS

| DE | 103 13 463 B3 | 4/2004 |
| DE | 10 2006 026 132 A1 | 6/2007 |
| EP | 1 110 854 A2 | 6/2001 |
| JP | 60-221230 A | 11/1985 |
| JP | 8-141945 A | 6/1996 |

OTHER PUBLICATIONS

Correponding International Search Report (PCT/ISA/210) dated Nov. 25, 2009 with English translation, including Forms PCT/ISA/220 and PCT/ISA/237 (Fourteen (14) pages).

* cited by examiner

*Primary Examiner* — Robert R Raevis
(74) *Attorney, Agent, or Firm* — Crowell & Moring LLP

(57) ABSTRACT

A method and a device for carrying out a work operation, on a workpiece continually moving forward on a conveying device, by an industrial robot moving along with the workpiece during a common run though a work path are provided. The industrial robot is displaceable along a separate longitudinal guide next to the conveying device. During the common run a base part of the industrial robot is rigidly coupled to a workpiece carrier, and the base part floats relative to a bogie running in the longitudinal guide. The industrial robot includes an exchangeable tool which, at the beginning of the common run through the working path, is a scanner tool connected to a working arm of the industrial robot. A relative position between the work piece and the workpiece carrier is determined from the reference coordinate system of the industrial robot.

13 Claims, 4 Drawing Sheets

METHOD AND DEVICE FOR CARRYING OUT A WORK OPERATION ON A MOVING WORKPIECE

CROSS-REFERENCE TO RELATED APPLICATIONS

The present application is a national stage of PCT International Application No. PCT/EP2009/005712, filed Aug. 6, 2009, and claims priority under 35 U.S.C. §119 to German Patent Application No. 10 2008 037 239.0, filed Aug. 9, 2008, the entire disclosures of which afore-mentioned documents are herein expressly incorporated by reference.

BACKGROUND AND SUMMARY OF THE INVENTION

The invention relates to a method for carrying out a work operation on a workpiece continually moving forward on a conveying device by an industrial robot moving along with the workpiece. The invention further relates to a device for carrying out such a method.

For the series production of workpieces, essentially two basic concepts exist. With synchronized manufacture, the workpieces to be processed are moved between work stations by a conveying device and are processed there in a standstill state. This is problematic with production lines with a plurality of processing stations, as the synchronization of the further movement of the workpieces between the work station depends ultimately on the work station with the longest processing duration. This results in faster work stations not being able to work at full capacity. Also, workpiece stores or buffer zones may have to be erected, which makes the manufacture more costly.

A continual, conveyor-synchronous processing of the workpiece is thus preferred. The processing of the workpiece takes place here, while the workpiece moves along on the conveying device. Today, conveyor-synchronous manufacturing methods are used predominantly, when workpieces are processed by human workers. A continuous conveyor-synchronous processing over an entire manufacturing line is thereby the exception. Automated processing steps, in particular those which are carried out by industrial robots are at present ill-suited for a conveyor-synchronous operation. These processing steps are thus usually carried out in a synchronous operation, which leads to additional problems with a change between synchronous and conveyor-synchronous sections of a manufacturing line. It is thus desirable to provide methods which permit carrying out robotic working steps in a conveyor-synchronous operation.

DE 103 13 463 B3 discloses a method as described above. An industrial robot is thereby moved along on a separate guide parallel to a conveying device carrying the workpiece. In order to balance position inexactnesses between the industrial robot and the workpiece, the subframe of the industrial robot is thereby coupled to a workpiece carrier. Position inexactnesses between the workpiece and the workpiece carrier are sensed at the start of the method by measuring in a stationary measuring device and are guided to the industrial robot control. In order to ensure the necessary position exactness, however, elaborate coupling devices between the subframe of the industrial robot and the workpiece are necessary. There is practically no play here for tolerances, as the measuring process takes place prior to the coupling.

The present invention provides a method and a device for carrying out a work operation on a workpiece moving forward synchronously with an industrial robot, which overcomes the mentioned disadvantages of the state of the art. A high position exactness between the industrial robot, the workpiece and the workpiece carrier shall be ensured in particular.

According to the present invention, the workpiece is moved along continually on a conveying device. The industrial robot is moved along next to the conveying device along a parallel separate longitudinal guide, wherein a base part of the industrial robot is rigidly coupled to a workpiece carrier during the common run-through of the processing path. In order to decouple the movement of the industrial robot from tolerances of the longitudinal guide, it is mounted in a floating manner with regard to a bogie running in the longitudinal guide. According to the invention, the industrial robot has an exchangeable tool. At the beginning of the common run-through of the work path, a scanner tool or a measuring head is first connected to a working arm of the industrial robot and a relative position between the workpiece and the workpiece carrier is determined by means of the scanner tool. The exact coordinates of the workpiece in the basic coordinate system of the industrial robot are known thereby in an advantageous manner. Tolerances regarding the coupling of the base part of the industrial robot to the workpiece carrier are thus balanced at the same time by the measurement. Thus, coupling devices are used between the base part of the industrial robot and the workpiece carrier that have higher tolerances than known from the state of the art.

After the measuring process, the scanner tool or the measuring head is exchanged for a processing tool. In particular, a processing tool for applying a hollow space conversation to the workpiece may be used. In order to carry out this exchange in a quick and efficient manner, it is thereby advantageous to provide a quick tool change device and a tool store.

By measuring the relative position of the workpiece, the workpiece carrier and the industrial robot, a coupling device may be used for the rigid coupling of the base part of the industrial robot to the workpiece carrier that is designed in a simple manner. In a further arrangement of the invention, a clamping cylinder is provided, which clamps the base part to a longitudinal bar of the workpiece carrier. The at least one clamping cylinder is thereby arranged on a feed plate that is connected to the base part in a movable manner in an exemplary embodiment of the invention.

The feed plate is moved in such a manner for the rigid coupling of the base part to the workpiece carrier, that a stop element arranged thereon comes into abutment with a corresponding element of the workpiece carrier, before the clamping cylinder is clamped to the longitudinal bar. Thus, the starting position of the industrial robot with regard to the workpiece carrier does not have to be kept absolutely precisely in an advantageous manner, in order to bring the coupling device into the desired coupling position. Rather, the exact positioning is generated by the movement of the feed plate. Tolerances resulting thereby can again be balanced by the measuring process by means of the measuring head.

After the rigid coupling of the base part to the workpiece carrier, a drive of the bogie of the industrial robot is decoupled in a further arrangement of the invention. The drive energy for the movement of the industrial robot by the work path is thus completely provided by the conveying device. This reduces the wear of the bogie compared to the methods known from the state of the art, where an active drive of the bogie is also used during the common run-through of the work path. In order to balance speed tolerances between the bogie and the conveying device, a slip coupling has to be provided with an active drive of the bogie, which has a high wear. This can be omitted in the present invention. Since no relative movement takes place between the industrial robot and the workpiece, the drag distance is also equal to zero.

Furthermore, the industrial robot follows all movements of the workpiece in all spatial directions with the method according to the invention, such as in the vertical direction by the weight balance in the vertical direction. No constraining forces result between the industrial robot and the workpiece in this manner, so that the danger of damage to the workpiece or disturbance of the manufacturing process is minimized.

The invention further relates to a device for carrying out a work operation at a workpiece moved along continually on a conveying device by an industrial robot moved along with the workpiece during a common run-through of a work path. The industrial robot can thereby be displaced on a separate longitudinal guide running next to the conveying device. The base part of the industrial robot can be coupled rigidly to a workpiece carrier during the common run-through, wherein bearing elements are provided, via which the base part can be mounted in a floating manner with regard to a bogie that can be moved along in the longitudinal guide. These bearing elements can be, for example, air spring bellows or the like.

According to an exemplary embodiment of the invention, the industrial robot has a tool exchange device with a tool store and a tool holder. At least two different tools can thereby be connected to a working arm of the industrial robot by means of the tool holder. A scanner device or a measuring head for measuring a relative position between the workpiece carrier and the workpiece can be connected to the working arm of the industrial robot. Furthermore, processing tools are provided, whereby one processing tool for applying a hollow space conservation to the workpiece can be connected to the working arm of the industrial robot. A measurement of the relative position of workpiece, workpiece carrier and industrial robot is thereby advantageously enabled directly in the coordinate system of the industrial robot.

In a further arrangement, at least one clamping cylinder is provided, by means of which the base part of the industrial robot can be coupled rigidly to a longitudinal bar of the workpiece carrier. This may be arranged on a feed plate, which is mounted in a displaceable manner with regard to the base part. The clamping cylinder can be moved into a required position with regard to the workpiece carrier by means of the feed plate. The access of the required position for coupling the base part of the industrial robot to the workpiece carrier thus does not have to be carried out by an exact positioning of the bogie of the industrial robot in the longitudinal guide, but the movement of the feed plate is eased considerably.

A stop element is provided at the feed plate in a further arrangement. The stop element can be brought into abutment with a corresponding element of the workpiece carrier for determining the required position.

A coupling is provided in a further embodiment, by means of which a drive unit of the bogie can be coupled to a drive wheel of the bogie. It is thereby possible to drive the industrial robot into a required position in a working phase before the rigid coupling to the workpiece carrier with its own drive. The coupling can be coupled out after the coupling to the workpiece carrier, so that the movement energy of the industrial robot is provided by the conveying device. After the end of the common run-through of the working path, the industrial robot can again be released from the workpiece carrier. At this time, the mentioned coupling can again be coupled in, so that the industrial robot can return into its starting position with its own drive.

BRIEF DESCRIPTION OF THE DRAWING FIGURES

The invention and its embodiments shall be explained in more detail in the following by means of the drawings.

DETAILED DESCRIPTION OF THE DRAWING FIGURES

Figure 1:
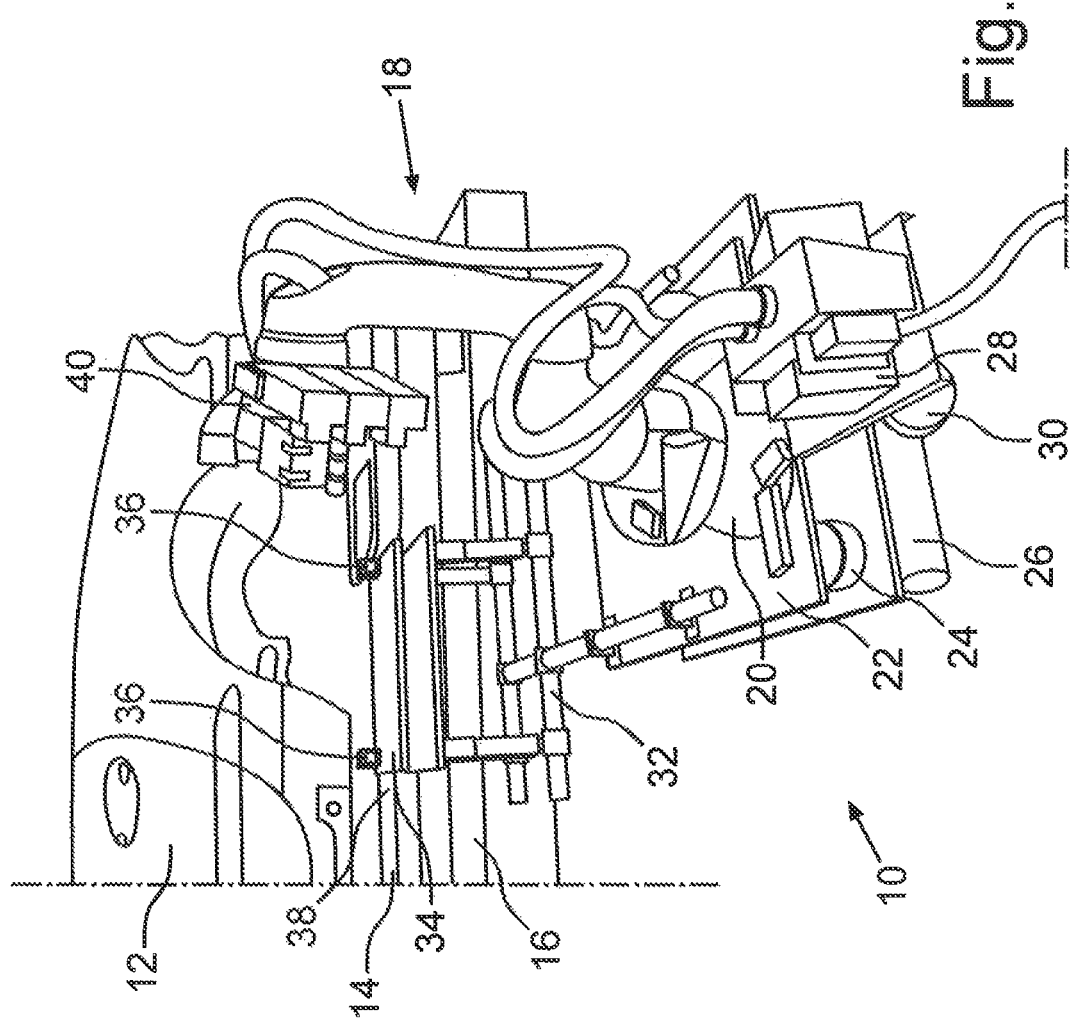
FIG. 1 is a perspective depiction of a device according to the invention.

FIG. 1 shows a perspective view of a device 10 for carrying out a method according to the invention. The workpiece to be processed, vehicle chassis 12, is fastened to a workpiece carrier 14, which is received in a movable manner on a conveying device 16. An industrial robot 18 is mounted on a base 22 with its base part 20, which base 22 is mounted on a bogie 26 via bellows cylinders 24. By means of an engine 28 and wheels 30, the industrial robot 18 can thus move parallel to the conveying device 16.

In order to achieve a safe positioning of the industrial robot 18 with regard to the vehicle chassis 12, the base part 20 of the industrial robot 18 is connected to a feed plate 34 via a linkage 32. The feed plate 34 can again be connected to a longitudinal bar 38 of the workpiece carrier 14 via clamping cylinders 36. A defined relative position between the industrial robot 18 and the vehicle chassis 12 is thereby produced.

A quick tool change device, not shown here, is present at a manipulator arm 40 of the industrial robot 18. The industrial robot can therewith receive and use different tools from a tool store. After coupling the industrial robot 18 by means of the clamping cylinders 36 to the longitudinal bar 38 of the workpiece carrier 14, the industrial robot 18 initially removes a scanner device from the tool store. The scanner device is mounted to the manipulator arm 40 and serves for the measurement of the relative position between the vehicle chassis 12 and workpiece carrier 14.

By the defined connection of the base part 20 of the industrial robot to the workpiece carrier 14, a defined relative position of the industrial robot 18 to the vehicle chassis 12 is thus also given. The results of this measurement are transferred by the industrial robot 18 to a control device, also not shown, which adapts the movement program for the industrial robot 18 to the now known exact coordinates of the parts at the vehicle chassis 12 to be processed. Furthermore, safety devices can be installed on the base plate 22 of the industrial robot 18 to enable a simultaneous processing of the motor vehicle chassis 12 by the industrial robot 18 and by human workers.

After the industrial robot 18 has concluded the measurement of the vehicle chassis 12, the scanner tool is exchanged with the actual processing tool via the quick tool change device.

The processing tool may be a nozzle for applying a medium for hollow space conservation in the illustrated embodiment.

Figure 2:
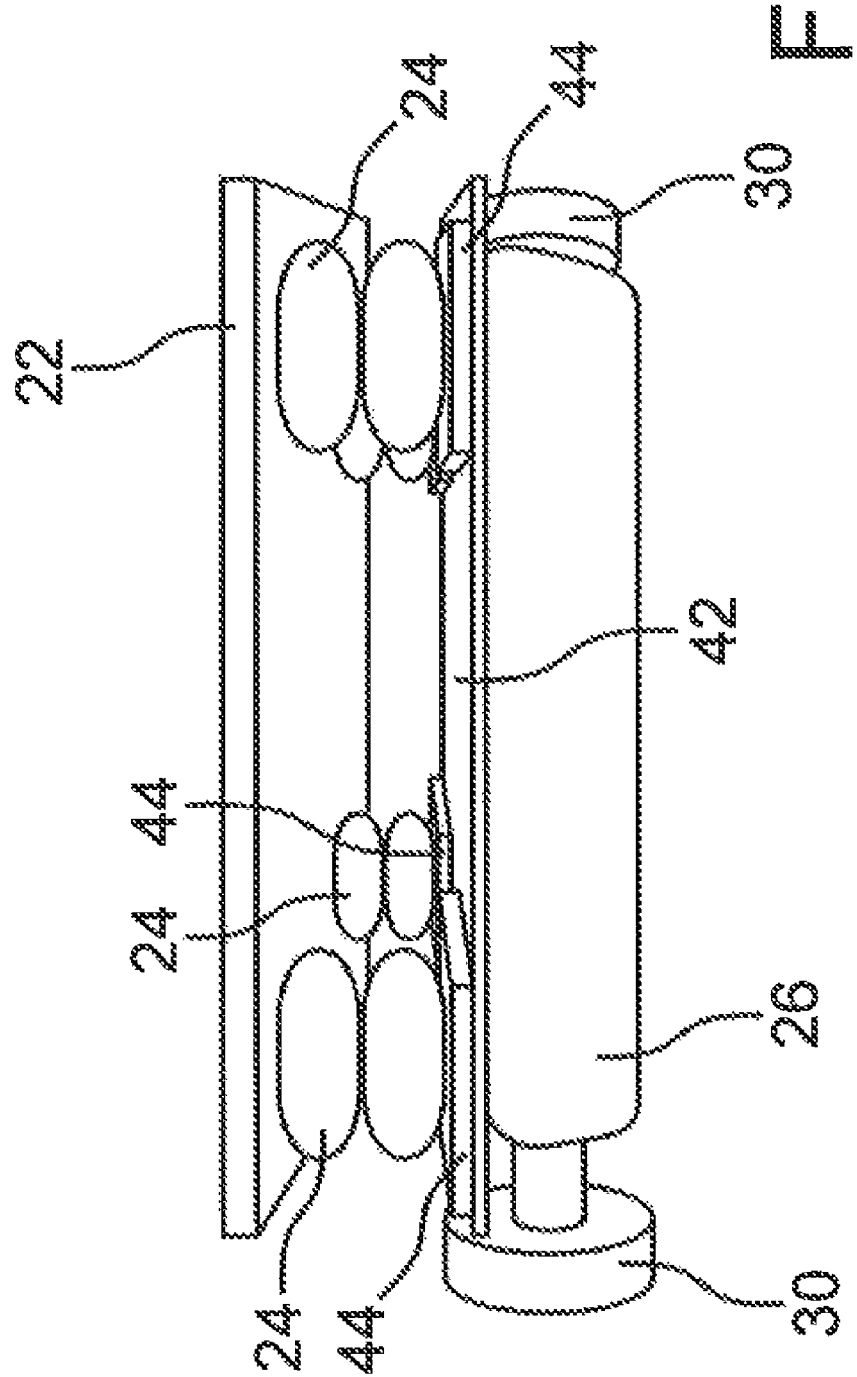
FIG. 2 is a perspective detailed depiction of a bogie for an industrial robot.

FIG. 2 shows a detailed view of the bogie of the industrial robot 18. Wheels 30 of polyoxymethylene, for example, are mounted in roller bearings at the actual bogie body 26. Polyoxymethylene has a very low friction resistance and has an extremely low wear, which makes the material ideal for this use. The wheels can thereby run on the plane floor, and also in steel rails.

The bogie body 26 may be formed as a pressure tank and can provide pressurized air for the bellows cylinders 24 mounted on a base plate in a simple manner. The bellows cylinders 24 thereby carry the base plate 22 for the industrial robot 18, which is not shown in the drawing. The bellows cylinders 24 are closed with adapter plates 44 towards the base plate 42 of the bogie 26. The adapter plates 44 are thereby simultaneously designed as sealing flanges and enable an application of the bellows cylinders 24 with pressurized air from the tank of the bogie 26. A separate feed of the air to the bellows cylinders is thereby not necessary.

By means of the shortest possible coupling, an ideal mounting of the base plate 22 with regard to the base 42 is enabled, as the bellows cylinders 24 can react extremely dynamically to movements in the z-axis. By means of the mounting of the base plate 22 over the bellows cylinders 24, the base plate 22 is thus decoupled from the base plate 42 in all degrees of freedom in a floating manner. The bellows cylinders 24 can additionally be applied with a higher pressure via valves, in order to lift the base plate 22 with regard to the base plate 42. This is particularly important during the coupling process of the industrial robot 18 to the workpiece carrier 14.

Figure 3:
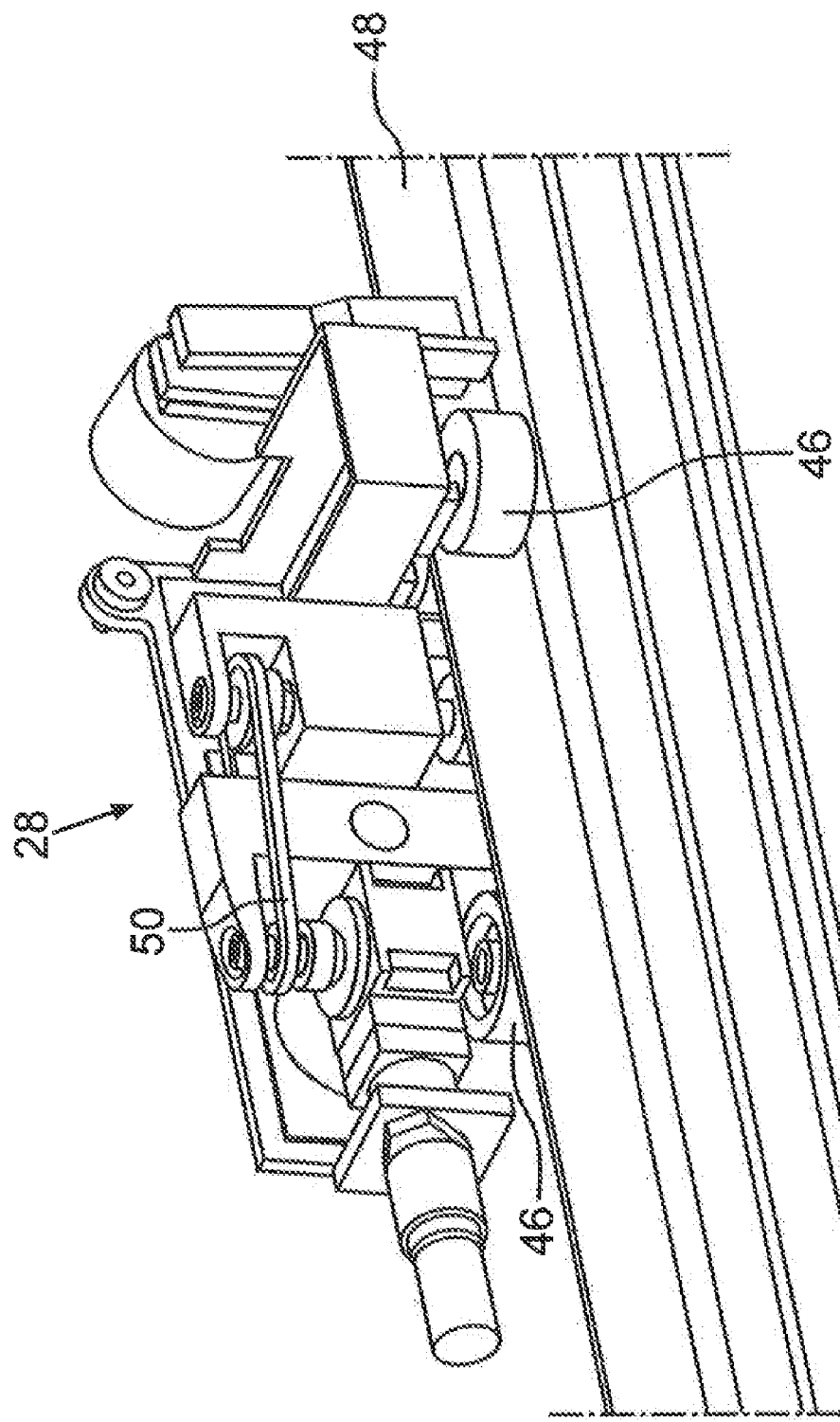
FIG. 3 is a perspective depiction of a drive for such a bogie.

The wheels 30 of the bogie 26 are thereby driven by an air motor. A schematic depiction of such an air motor is shown in FIG. 3. The air motor 28 thereby drives a plurality of rollers 46 rotatable around the z-axis, which permit the drive and the guide of the entire unit along a guide angle 48. The force transfer from the pressurized air-driven air motor 28 to the guide rollers 48 thereby takes place via gear wheel chain combinations 50. The execution of the drive as an air motor permits a certain extent of slip. It is important during the coupling process of the industrial robot 18 to the workpiece carrier 14, as the speeds of the bogie 26 and the speed of the workpiece carrier have to be adapted to each other during this coupling. Small speed differences are thereby compensated by slip in the air motor 28. A separate slip coupling, which is prone to wear, is not necessary.

Figure 4:
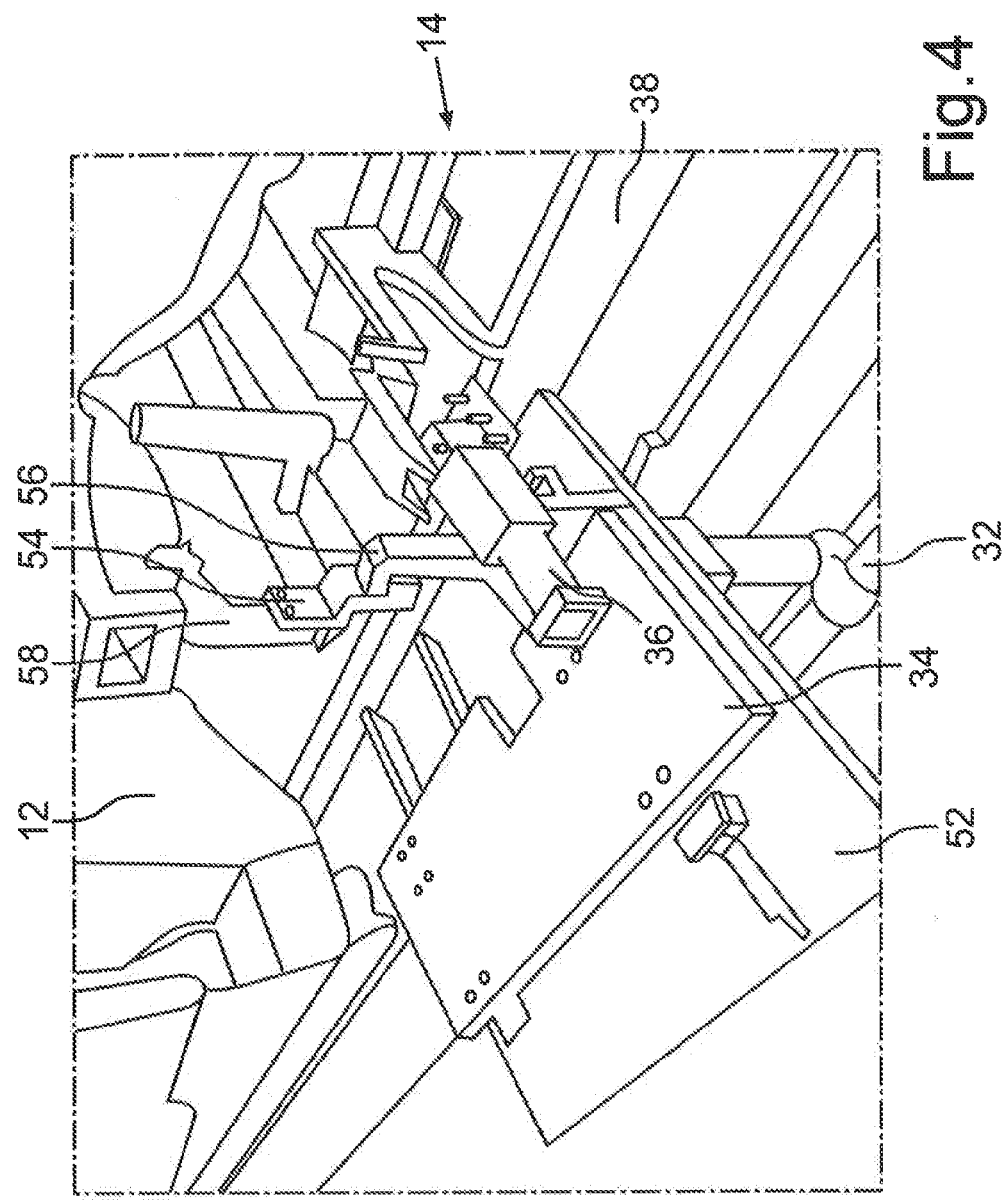
FIG. 4 is a perspective depiction of a feed plate for coupling the base part of an industrial robot to a longitudinal bar of a workpiece carrier.

FIG. 4 shows a perspective view of the feed plate 34. The actual feed plate 34, which carries the clamping cylinder 36 for coupling the entire device to the longitudinal bar 38 of the workpiece carrier 14, is thereby itself mounted in a movable manner with regard to a further plate 52. A pivotable stop element 54 is further connected to the feed plate 54 via a carrier 56. During the coupling process of the industrial robot 18 to the workpiece carrier 14, the stop element 54 is expanded with regard to the carrier 56 and the feed plate 34 is moved in such a manner that the stop element 54 comes into abutment with a corresponding element 58 of the workpiece carrier 14. It is now ensured in this position that the clamping cylinder 36 can grip the bar 38 and can fix the entire device thereon. Via the linkage, the industrial robot is rigidly connected to the workpiece carrier 14 via the base plate 22, and also the bogie 26 via the interposition of the bellows cylinders 24.

An exemplary embodiment of a method according to the invention is briefly explained below.

At the starting time, the industrial robot 18 is in a starting region of the working path which is run through together. The drive 28 of the industrial robot is then initially coupled in. Parallel to this, a measuring head, that is, the scanner unit, is removed from the tool store and adapted to the manipulator arm 40. The drive is now switched to feed, so that the industrial robot 18 advances parallel to the conveying device 16. It is hereby checked continually if the industrial robot 18 has achieved the correct coupling position regarding a workpiece carrier 14 with a vehicle chassis 12 to be processed. If this position is reached, the feed plate 34 is positioned with regard to the base plate 52 by means of displacement. By reducing the pressure in the bellows cylinders 24, the base plate 22 is lowered, so that clamping cylinders 36 reach the right relative position to the longitudinal bar 38 of the workpiece carrier 14. As soon as this relative position is reached, the clamping cylinders 36 are clamped, so that a rigid form-fit connection between the industrial robot 18 and the workpiece carrier 14 results. For the position securing of the feed plate, it may be fixed by securing bolts.

At this time, the drive 28 of the industrial robot 18 is deactivated and decoupled. The advancement of the industrial robot 18 together with the workpiece carrier 14 is thus only achieved by the conveying device 16 from this time onwards. Since a defined relative position between the industrial robot 18, the workpiece carrier 14 and the vehicle chassis 12 to be processed is now made, the relative position between these parts is measured at this time by means of the measuring head. For example, a 3-D measuring head with an analogous measuring value output may be used, whose data are transmitted directly to the control of the industrial robot 18. The control program can thereafter be adapted to the industrial robot 18 on the basis of the measured coordinates. After the measuring process, the measuring head is exchanged for a nozzle by means of the quick tool change device for applying a medium for the hollow conservation. While the industrial robot 18 further moves parallel to the vehicle chassis 12 to be processed, the actual processing now takes place, namely the application of a hollow space conservation to corresponding parts of the vehicle chassis 12.

When this work step is concluded, the drive is coupled in again and switched up to the starting position. Parallel to this, the processing tool is again released from the quick tool change device and deposited in the tool store.

After the industrial robot drives under its own drive again, the clamping cylinders can be released, after which the bellows cylinders are again applied with pressure to lift the base plate 22. The feed plate 34 can now again be released from its locking position, the pivotable stop 54 can be pivoted again into its resting position and the entire feed plate 34 can finally be brought again into its starting position. The industrial robot 18 has now reached the end of the entire working path. At this time, the drive is activated and switched to the return mode after the downsizing of the residual speed, so that the industrial robot 18 can return to its starting position. If the check results in a determination that the industrial robot has reached its starting position again, the drive of the industrial robot 18 is deactivated in the last step of the method. The industrial robot is now again in starting conditions with all of its systems, so that the method for processing the next workpiece can start anew.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for carrying out a work operation on a workpiece continually moving forward on a conveying device by an industrial robot that moves along with the workpiece during a common run through a work path, comprising the acts of:

connecting a scanner tool to a working arm of the industrial robot at the beginning of the common run, the scanner tool being exchangeable with other tools;

displacing the industrial robot along a separate longitudinal guide next to the conveying device;

rigidly coupling a base part of the industrial robot to a workpiece carrier during the common run, the base part being mounted via bearing elements to a bogie running in the longitudinal guide, such that movement of the industrial robot is decoupled from movement of the longitudinal guide; and determining a relative position between the workpiece and the workpiece carrier.

2. The method according to claim 1, wherein the scanner tool is exchanged for a processing tool after determining the relative position.

3. The method according to claim 2, wherein the processing tool applies a hollow space conservation to the workpiece.

4. The method according to claim 1, wherein at least one clamping cylinder rigidly couples the base part to the workpiece carrier, and the at least one clamping cylinder clamps the base part to a longitudinal bar of the workpiece carrier.

5. The method according to claim 4, wherein the at least one clamping cylinder is arranged on a feed plate connected to the base part in a displaceable manner, wherein the feed plate is displaced for the rigid coupling with the workpiece carrier in such a manner that a stop element arranged thereon comes into abutment with a corresponding element of the workpiece carrier, before the at least one clamping cylinder is clamped to the longitudinal bar.

6. The method according to claim 1, wherein a drive of the bogie is decoupled after the rigid coupling of the base part to the workpiece carrier.

7. A device for carrying out a work operation on a workpiece continually moving forward on a conveying device, the device comprising:

an industrial robot that moves along with the workpiece during a common run through a work path and carries out the work operation on the workpiece;

wherein the industrial robot is displaceable along a separate longitudinal guide next to the conveying device and, during the common run a base part of the industrial robot is rigidly coupled to a workpiece carrier, wherein bearing elements are provided, via which the base part is mounted to a bogie running in the longitudinal guide, such that movement of the industrial robot is decoupled from movement of the longitudinal guide, and wherein at least two different tools are connectable to a work space of the industrial robot.

8. The device according to claim 7, wherein a scanner device for measuring a relative position between the workpiece carrier and the workpiece is connected to the working arm of the industrial robot.

9. The device according to claim 7, wherein a processing tool for applying a hollow space conservation on the workpiece is connected to the working arm of the industrial robot.

10. The device according to claim 7, further comprising at least one clamping cylinder configured to couple the base part of the industrial robot to a longitudinal bar of the workpiece carrier in a rigid manner.

11. The device according to claim 10, further comprising a feed plate mounted in a displaceable manner with regard to the base part, wherein the clamping cylinder is movable into a required position with regard to the workpiece carrier via the feed plate.

12. The device according to claim 11, further comprising a stop element disposed at the feed plate, wherein the stop element is brought into abutment with a corresponding element of the workpiece carrier for determining the required position.

13. The device according claim 7, further comprising a coupling configured to couple a drive unit of the bogie to a drive wheel of the bogie.

* * * * *